United States Patent
Pillai

(10) Patent No.: US 7,711,057 B2
(45) Date of Patent: *May 4, 2010

(54) APPARATUS AND METHOD FOR PROVIDING ENERGY—BANDWIDTH TRADEOFF AND WAVEFORM DESIGN IN INTERFERENCE AND NOISE

(75) Inventor: Unnikrishna Sreedharan Pillai, Harrington Park, NJ (US)

(73) Assignee: C & P Technologies, Inc., Closter, NJ (US)

( * ) Notice: Subject to any disclaimer, the term of this patent is extended or adjusted under 35 U.S.C. 154(b) by 712 days.

This patent is subject to a terminal disclaimer.

(21) Appl. No.: 11/623,965

(22) Filed: Jan. 17, 2007

(65) Prior Publication Data
US 2008/0170491 A1 Jul. 17, 2008

(51) Int. Cl.
*H04B 1/00* (2006.01)
*H04L 27/00* (2006.01)
*G01N 30/86* (2006.01)
*H03K 5/01* (2006.01)

(52) U.S. Cl. .......................... 375/259; 375/145; 327/1; 327/100; 178/66.1

(58) Field of Classification Search ............... 178/66.1; 327/1, 100; 375/259
See application file for complete search history.

(56) References Cited

U.S. PATENT DOCUMENTS 7,109,714 B2 * 9/2006 Rudakov et al. ........... 324/322
2005/0046609 A1 * 3/2005 Wasiewicz ................. 342/159
2005/0116714 A1 * 6/2005 Rudakov et al. ........... 324/322
2006/0238406 A1 * 10/2006 Nohara et al. ............... 342/90
2007/0008214 A1 * 1/2007 Wasiewicz ................. 342/159
2007/0040556 A1 * 2/2007 Rudakov et al. ........... 324/322
2008/0166976 A1 * 7/2008 Rao ........................... 455/69

OTHER PUBLICATIONS

"Optimum Signals in Noise and Reverberation", Author Theo Kooij, Saciant ASW Research Centre, Le Spezia, Italy, presented at "Nato Advanced Study Institute on Signal Processing with Emphasis on Underwater Acoustics", Enschede, the Netherlands, Aug. 23, 1968.

* cited by examiner

*Primary Examiner*—David C Payne
*Assistant Examiner*—Erin M File
(74) *Attorney, Agent, or Firm*—Walter J. Tencza, Jr.

(57) ABSTRACT

A new method for transmitter-receiver design that enhances the desired signal output from the receiver while minimizing the total interference and noise output from the receiver at the desired decision making instant is presented. Further the new design scheme proposed here can be used for transmit signal energy and bandwidth tradeoff. As a result, transmit signal energy can be used to tradeoff for the "premium" signal bandwidth without sacrificing the system performance level in terms of the output Signal to Interference plus Noise power Ratio (SINR). The two designs—the one before and the one after the tradeoff—will result in two different transmitter-receiver pairs that have the same performance level. In many applications such as in telecommunications, since the available bandwidth is at premium, such a tradeoff will result in releasing otherwise unavailable bandwidth at the expense of additional signal energy. The bandwidth so released can be used for other applications or to add additional telecommunication capacity to the system.

36 Claims, 6 Drawing Sheets

Fig. 1
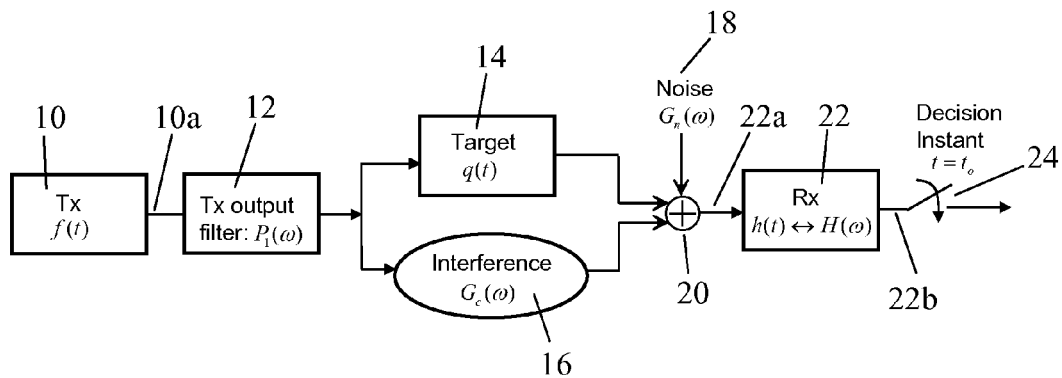
Fig. 2A    Fig. 2B
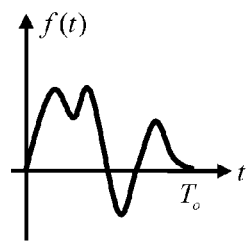 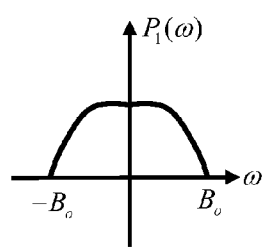

APPARATUS AND METHOD FOR PROVIDING ENERGY—BANDWIDTH TRADEOFF AND WAVEFORM DESIGN IN INTERFERENCE AND NOISE

STATEMENT REGARDING FEDERALLY SPONSORED RESEARCH OR DEVELOPMENT

The present invention is based upon work supported and/or sponsored by the Air Force Research Laboratory (AFRL), Rome, N.Y. under contract No. FA8750-06-C-0202

FIELD OF INVENTION

The invention relates to techniques related to a tradeoff between transmit signal Energy and its Bandwidth using new transmitter-receiver waveform design methods that are applicable for radar, sonar and wireless communications.

BACKGROUND OF INVENTION

In the general problem, a desired target is buried in both interference and noise. A transmit signal excites both the desired target and the interference simultaneously. The interference and/or interferences can be foliage returns in the form of clutter for radar, scattered returns of the transmit signal from a sea-bottom and different ocean-layers in the case of sonar, or multipath returns in a communication scene. In all of these cases, like the target return, the interference returns are also transmit signal dependent, and hence it puts conflicting demands on the receiver. In general, the receiver input is comprised of target returns, interferences and the ever present noise. The goal of the receiver is to enhance the target returns and simultaneously suppress both the interference and noise signals. In a detection environment, a decision regarding the presence or absence of a target is made at some specified instant $t=t_0$ using output data from a receiver, and hence to maximize detection, the Signal power to average Interference plus Noise Ratio (SINR) at the receiver output can be used as an optimization goal. This scheme is illustrated in FIG. 1.

The transmitter output bandwidth can be controlled using a known transmitter output filter having a transfer function $P_1(\omega)$ (see FIG. 2A). A similar filter with transform characteristics $P_2(\omega)$ can be used at a receiver input 22a shown in FIG. 1, to control the processing bandwidth as well.

The transmit waveform set f(t) at an output 10a of FIG. 1, can have spatial and temporal components to it each designated for a specific goal. The simplest situation is that shown in FIG. 2A where a finite duration waveform f(t) of energy E is to be designed. Thus $$\int_0^{T_o} |f(t)|^2 dt = E. \qquad (1)$$

Usually, transmitter output filter 12 characteristics $P_1(\omega)$, such as shown in FIG. 2B, are known and for design purposes, it is best to incorporate the transmitter output filter 12 and the receiver input filter (which may be part of receiver 22) along with the target and clutter spectral characteristics.

Let $q(t) \leftrightarrow Q(\omega)$ represent the target impulse response and its transform. In general q(t) can be any arbitrary waveform. Thus the modified target that accounts for the target output filter has transform $P_1(\omega)Q(\omega)$ etc. In a linear domain setup, the transmit signal f(t) interacts with the target q(t), or target 14 shown in FIG. 1, to generate the output below (referred to in S. U. Pillai, H. S. Oh, D. C. Youla, and J. R. Guerci, "Optimum Transmit-Receiver Design in the Presence of Signal-Dependent Interference and Channel Noise", IEEE Transactions on Information Theory, Vol. 46, No. 2, pp. 577-584, March 2000 and J. R. Guerci and S. U. Pillai, "Theory and Application of Optimum Transmit-Receive Radar," IEEE International Radar Conference, Alexandria Va., May 2000, pp. 705-710):

$$s(t) = f(t) * q(t) = \int_0^{T_o} f(\tau) q(t-\tau) d\tau \qquad (2)$$

that represents the desired signal.

The interference returns are usually due to the random scattered returns of the transmit signal from the environment, and hence can be modeled as a stochastic signal $w_c(t)$ that is excited by the transmit signal f(t). If the environment returns are stationary, then the interference can be represented by its power spectrum $G_c(\omega)$. This gives the average interference power to be $G_c(\omega)|F(\omega)|^2$. Finally let n(t) represent the receiver 22 input noise with power spectral density $G_n(\omega)$. Thus the receiver input signal at input 22a equals $$r(t)=s(t)+w_c(t)*f(t)+n(t), \qquad (3)$$

and the input interference plus noise power spectrum equals $$G_I(\omega)=G_c(\omega)|F(\omega)|^2+G_n(\omega). \qquad (4)$$

The received signal is presented to the receiver 22 at input 22a with impulse response h(t). The simplest receiver is of the noncausal type.

With no restrictions on the receiver 22 of FIG. 1, its output signal at output 22b in FIG. 1, and interference noise components are given by $$y_s(t) = s(t) * h(t) = \frac{1}{2\pi} \int_{-\infty}^{+\infty} S(\omega) H(\omega) e^{j\omega t} d\omega \qquad (5)$$

and $$y_n(t) = \{w_c(t) * f(t) + n(t)\} * h(t). \qquad (6)$$

The output $y_n(t)$ represents a second order stationary stochastic process with power spectrum below (referred to in the previous publications and in Athanasius Papoulis, S. Unnikrishna Pillai, Probability, Random Variables and Stochastic Processes, McGraw-Hill Higher Education, New York 2002):

$$G_o(\omega)=(G_c(\omega)|F(\omega)|^2+G_n(\omega))|H(\omega)|^2 \qquad (7)$$

and hence the total output interference plus noise power is given by $$\sigma_{I+N}^2 = \frac{1}{2\pi} \int_{-\infty}^{+\infty} G_0(\omega) d\omega \qquad (8)$$

$$= \frac{1}{2\pi} \int_{-\infty}^{+\infty} (G_C(\omega)|F(\omega)|^2 + G_n(\omega))|H(\omega)|^2 d\omega.$$

Referring back to FIG. 1, the signal component $y_s(t)$ in equation (5) at the receiver output 22b needs to be maximized at the decision instant $t_o$ in presence of the above interference and noise. Hence the instantaneous output signal power at $t=t_o$ is given by the formula below shown in S. U. Pillai, H. S.

Oh, D. C. Youla, and J. R. Guerci, "Optimum Transmit-Receiver Design in the Presence of Signal-Dependent Interference and Channel Noise", IEEE Transactions on Information Theory, Vol. 46, No. 2, pp. 577-584, March 2000, which is incorporated by reference herein:

$$P_O = |y_s(t_o)|^2 = \left| \frac{1}{2\pi} \int_{-\infty}^{+\infty} S(\omega) H(\omega) e^{j\omega t_o} d\omega \right|^2. \tag{9}$$

This gives the receiver output SINR at $t=t_o$ be the following as specified in Guerci et. al., "Theory and Application of Optimum Transmit-Receive Radar", pp. 705-710; and Pillai et. al., "Optimum Transmit-Receiver Design in the Presence of Signal-Dependent Interference and Channel Noise", incorporated herein by reference:

$$SINR = \frac{P_o}{\sigma_{I+N}^2} = \frac{\left| \frac{1}{2\pi} \int_{-\infty}^{+\infty} S(\omega) H(\omega) e^{j\omega t_o} d\omega \right|^2}{\frac{1}{2\pi} \int_{-\infty}^{+\infty} G_I(\omega) |H(\omega)|^2 d\omega}. \tag{10}$$

We can apply Cauchy-Schwarz inequality in equation (10) to eliminate $H(\omega)$. This gives $$SINR \le \frac{1}{2\pi} \int_{-\infty}^{+\infty} \frac{|S(\omega)|^2}{G_I(\omega)} d\omega \tag{11}$$

$$= \frac{1}{2\pi} \int_{-\infty}^{+\infty} \frac{|Q(\omega)|^2 |F(\omega)|^2}{G_c(\omega) |F(\omega)|^2 + G_n(\omega)} d\omega$$

$$= SINR_{\max}.$$

Thus the maximum obtainable SINR is given by equation (11), and this is achieved if and only if the following equation referred to in previous prior art publications, is true:

$$H_{opt}(\omega) = \frac{S*(\omega)}{G_c(\omega)|F(\omega)|^2 + G_n(\omega)} e^{-j\omega t_o} \tag{12}$$

$$= \frac{Q*(\omega) F*(\omega)}{G_c(\omega)|F(\omega)|^2 + G_n(\omega)} e^{-j\omega t_o}.$$

In (12), the phase shift $e^{-j\omega t_o}$ can be retained to approximate causality for the receiver waveform. Interestingly even with a point target ($Q(\omega) \equiv 1$), flat noise ($G_n(\omega) = \sigma_n^2$), and flat clutter ($G_c(\omega) = \sigma_c^2$), the optimum receiver is not conjugate-matched to the transmit signal, since in that case from equation (12) we have the following formula given by Pillai et. al., "Optimum Transmit-Receiver Design in the Presence of Signal-Dependent Interference and Channel Noise", incorporated herein by reference, Papoulis, "Probability, Random Variables and Stochastic Processes", and H. L. Van Trees, Detection, Estimation, and Modulation Theory, Part 1, New York: John Wiley and Sons, 1968, incorporated by reference:

$$H_{opt}(\omega) = \frac{F*(\omega)}{\sigma_c^2 |F(\omega)|^2 + \sigma_n^2} e^{-j\omega t_o} \ne F*(\omega) e^{-j\omega t_o}. \tag{13}$$

Prior Art Transmitter Waveform Design

When the receiver design satisfies equation (12), the output SINR is given by the right side of the equation (11), where the free parameter $|F(\omega)|^2$ can be chosen to further maximize the output SINR, subject to the transmit energy constraint in (1). Thus the transmit signal design reduces to the following optimization problem:

Maximize $$SINR_{\max} = \frac{1}{2\pi} \int_{-\infty}^{+\infty} \frac{|Q(\omega)|^2 |F(\omega)|^2}{G_c(\omega) |F(\omega)|^2 + G_n(\omega)} d\omega, \tag{14}$$

subject to the energy constraint $$\int_0^{T_o} |f(t)|^2 dt = \frac{1}{2\pi} \int_{-\infty}^{+\infty} |F(\omega)|^2 d\omega = E. \tag{15}$$

To solve this new constrained optimization problem, combine (14)-(15) to define the modified Lagrange optimization function (referred to in T. Kooij, "Optimum Signal in Noise and Reverberation", *Proceeding of the NATO Advanced Study Institute on Signal Processing with Emphasis on Underwater Acoustics*, Vol. I, Enschede, The Netherlands, 1968.)

$$\Lambda = \int_{-\infty}^{+\infty} \left\{ \frac{|Q(\omega)|^2 y^2(\omega)}{G_c(\omega) y^2(\omega) + G_n(\omega)} - \frac{1}{\lambda^2} y^2(\omega) \right\} d\omega \tag{16}$$

where $$y(\omega) = |F(\omega)| \tag{17}$$

is the free design parameter. From (16) (17), $$\frac{\partial \Lambda}{\partial y} = 0 \text{ gives}$$

$$\frac{\partial \Lambda(\omega)}{\partial y} = 2y(\omega) \left\{ \frac{G_n(\omega) |Q(\omega)|^2}{\{G_c(\omega) y^2 - (\omega) - G_n(\omega)\}^2} - \frac{1}{\lambda^2} \right\} = 0. \tag{18}$$

where $\Lambda(\omega)$ represents the quantity within the integral in (16). From (18), either $$y(\omega) = 0 \tag{19}$$

or $$\frac{G_n(\omega) |Q(\omega)|^2}{\{G_c(\omega) y^2(\omega) + G_n(\omega)\}^2} - \frac{1}{\lambda^2} = 0, \tag{20}$$

which gives $$y^2(\omega) = \frac{\sqrt{G_n(\omega)} \left(\lambda |Q(\omega)| - \sqrt{G_n(\omega)}\right)}{G_c(\omega)} \quad (21)$$

provided $y^2(\omega) > 0$. See T. Kooij cited above incorporated by reference herein.

SUMMARY OF THE INVENTION

One or more embodiments of the present invention provide a method and an apparatus for transmitter-receiver design that enhances the desired signal output from the receiver while minimizing the total interference and noise output at the desired decision making instant. Further the method and apparatus of an embodiment of the present invention can be used for transmit signal energy-bandwidth tradeoff. As a result, transmit signal energy can be used to tradeoff for "premium" signal bandwidth without sacrificing performance level in terms of the output Signal to Interference plus Noise power Ratio (SINR). The two designs—before and after the tradeoff—will result in two different transmitter-receiver pairs that have the same performance level. Thus a design that uses a certain energy and bandwidth can be traded off with a new design that uses more energy and lesser bandwidth compared to the old design. In many applications such as in telecommunications, since the available bandwidth is at premium, such a tradeoff will result in releasing otherwise unavailable bandwidth at the expense of additional signal energy. The bandwidth so released can be used for other applications or to add additional telecommunications capacity.

BRIEF DESCRIPTION OF THE DRAWINGS

FIG. 1 shows a diagram of a system, apparatus, and/or method including a transmitter, a transmitter output filter, a receiver, a target, interference, noise, and a switch;

FIG. 2A shows a prior art graph of a prior art transmitter signal versus time, wherein the transmitter signal is output from a transmitter, such as in FIG. 1;

FIG. 2B shows a prior art graph of a possible frequency spectrum of a known transmitter output filter, such as in FIG. 1;

DETAILED DESCRIPTION OF THE DRAWINGS

Figure 3A:
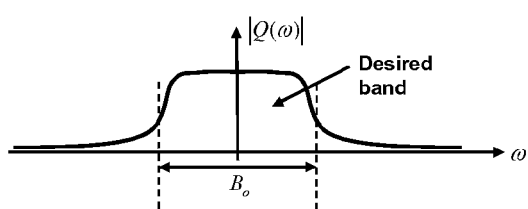
FIG. 3A shows a graph of target transfer function magnitude response versus frequency.

FIG. 1 shows a diagram of a system, apparatus, and/or method 1, including a transmitter 10, a transmitter output filter 12, a target 14, interference 16, noise 18, a summation block 20, receiver 22, and a switch 24. The present invention, in one or more embodiments, provides a new method and apparatus, by selecting a particular transmit signal f(t), to be output from transmitter 10, and a type of receiver or receiver transfer function for receiver 22 in accordance with criteria to be discussed below.

The transmitter 10 transmits an output signal f(t) at its output 10a and supplies this signal to the transmitter output filter 12. As remarked earlier, for design purposes, the transmitter output filter 12 can be lumped together with the target transfer function as well as the interference spectrum. The transmit signal f(t) passes through the airwaves and interacts with a target 14 and interference 16. The target-modified as well as the clutter-modified (or interference modified) versions of the transmit signal f(t) are supplied to the summation block 18 along with receiver noise 18. The summation block 18 may simply be used for description purposes to indicate that the target modified, clutter modified, and noise signals combine together. A combination signal is supplied to receiver 22 at its input 22a. The receiver 22 applies a transfer function H(ω) (which will be determined and/or selected by criteria of an embodiment of the present invention, to be described below) and a modified combination signal is provided at a receiver output 22b. The output is accessed at time t=$t_o$ by use of switch 24.

FIG. 2A shows a prior art graph of a prior art transmitter output signal f(t) versus time. The signal used here is arbitrary.

FIG. 2B shows a prior art graph of a frequency spectrum of the transmitter output filter 12 of FIG. 1.

FIG. 3A shows a typical graph of a target transfer function magnitude response for target 14 versus frequency; target as appearing in (14)-(21).

Figure 3B:
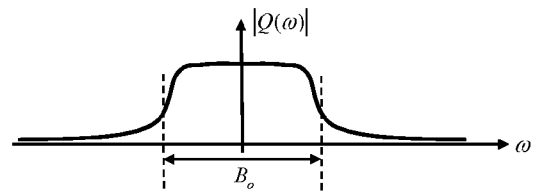
FIG. 3B shows a graph of target transfer function magnitude response versus frequency.

FIG. 3B shows a typical graph of target transfer function magnitude response for target 14 versus frequency; target as appearing in (14)-(21).

Figure 3C:
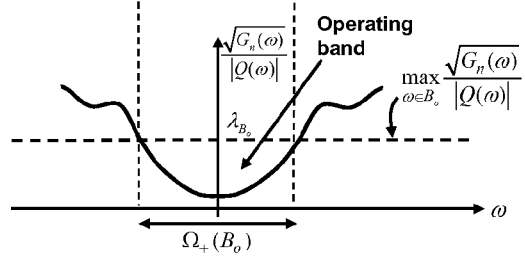
FIG. 3C shows a graph of noise power spectrum divided by target transfer function magnitude response versus frequency.

FIG. 3C shows a graph of noise power spectrum divided by target transfer function magnitude response versus frequency; as in right side of equation (23).

Figure 3D:
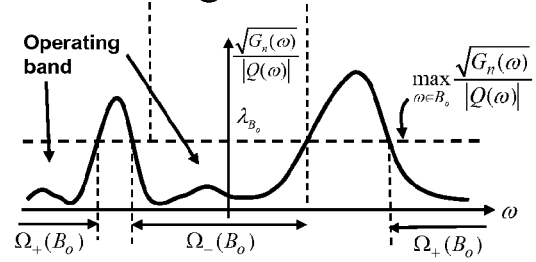
FIG. 3D shows a graph of noise power spectrum divided by target transfer function magnitude response versus frequency.

FIG. 3D shows a graph of noise power spectrum divided by target transfer function magnitude response versus frequency; as in right side of equation (23).

Figure 4A:
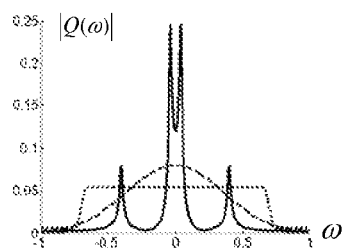
FIG. 4A shows graphs of three different target transfer function magnitude responses versus frequency.

FIG. 4A shows graphs of three different target transfer function magnitude responses versus frequency; target as appearing in (14)-(21).

Figure 4B:
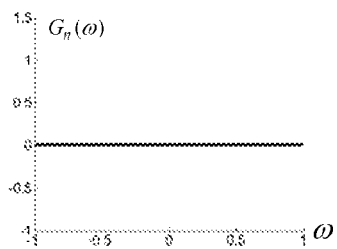
FIG. 4B shows a graph of noise power spectrum versus frequency.

FIG. 4B shows a graph of noise power spectrum versus frequency as appearing in equations (14)-(23).

Figure 4C:
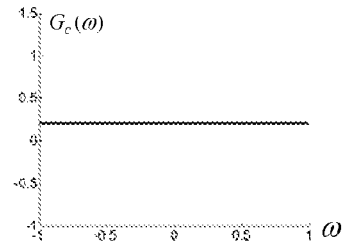
FIG. 4C shows a graph of clutter power spectrum versus frequency.

FIG. 4C shows a graph of clutter power spectrum versus frequency as appearing in equations (14)-(23).

Figure 4D:
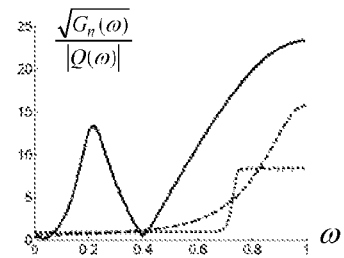
FIG. 4D shows a graph of noise power spectrum divided by target transfer function magnitude response versus frequency.

FIG. 4D shows a graph of noise power spectrum divided by target transfer function magnitude response versus frequency as in right side of equation (23).

Figure 4E:
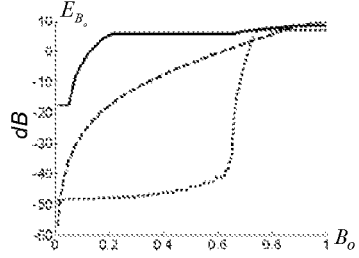
FIG. 4E shows a graph of transmitter threshold energy versus bandwidth.

FIG. 4E shows a graph of transmitter threshold energy versus bandwidth using equation (26).

Figure 4F:
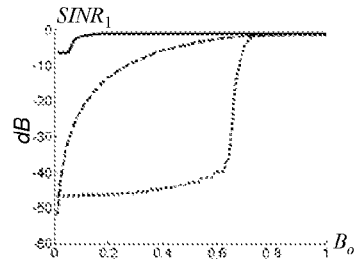
FIG. 4F shows a graph of signal to inference plus noise ratio (SINR) versus bandwidth.

FIG. 4F shows a graph of signal to inference plus noise ratio versus bandwidth using equations (27)-(31).

Figure 5A:
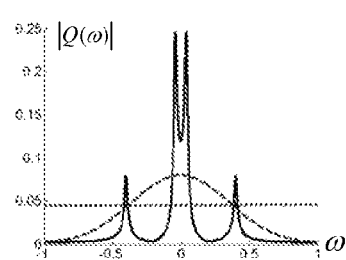
FIG. 5A shows graphs of three different target transfer function magnitude responses versus frequency.

FIG. 5A shows graphs of three different target transfer function magnitude responses versus frequency; target as appearing in (14)-(21).

Figure 5B:
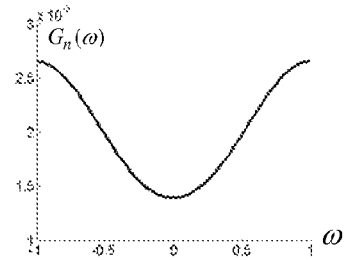
FIG. 5B shows a graph of noise power spectrum versus frequency.

FIG. 5B shows a graph of noise power spectrum versus frequency as appearing in equations (14)-(23).

Figure 5C:
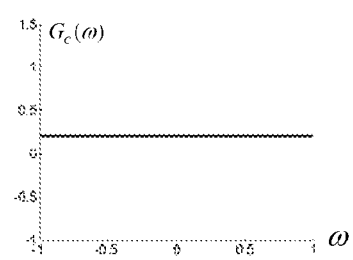
FIG. 5C shows a graph of clutter power spectrum versus frequency.

FIG. 5C shows a graph of clutter power spectrum versus frequency as appearing in equations (14)-(23).

Figure 5D:
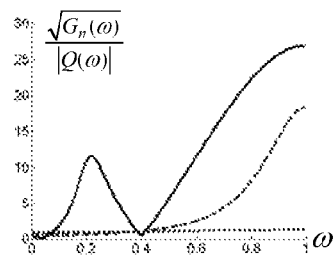
FIG. 5D shows a graph of noise power spectrum divided by target transfer function magnitude response versus frequency.

FIG. 5D shows a graph of noise power spectrum divided by target transfer function magnitude response versus frequency as in right side of equation (23).

Figure 5E:
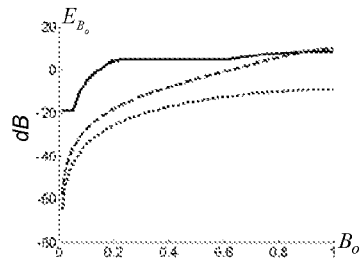
FIG. 5E shows a graph of transmitter threshold energy versus bandwidth.

FIG. 5E shows a graph of transmitter threshold energy versus bandwidth using equation (26).

Figure 5F:
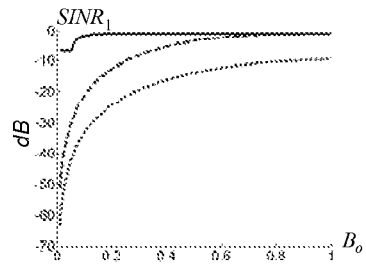
FIG. 5F shows a graph of signal to inference plus noise ratio (SINR) versus bandwidth.

FIG. 5F shows a graph of signal to inference plus noise ratio versus bandwidth using equations (27)-(31).

Figure 6A:
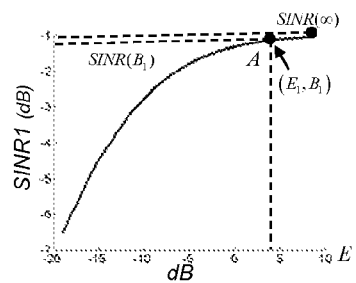
FIG. 6A shows a graph of signal to interference plus noise ratio versus energy for a resonant target shown in FIG. 5A (solid line)

FIG. 6A shows a graph of signal to interference plus noise ratio versus energy for a resonant target shown in FIG. 5A (solid line) using equations (34)-(35).

Figure 6B:
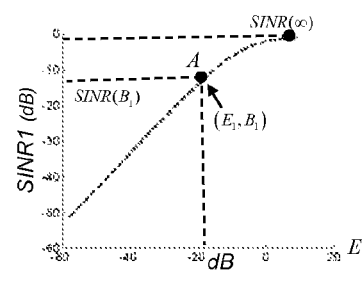
FIG. 6B shows a graph of signal to interference plus noise ratio versus energy for a low pass target shown in FIG. 5A (dashed line)

FIG. 6B shows a graph of signal to interference plus noise ratio versus energy for a low pass target shown in FIG. 5A (dashed line) using equations (34)-(35).

Figure 6C:
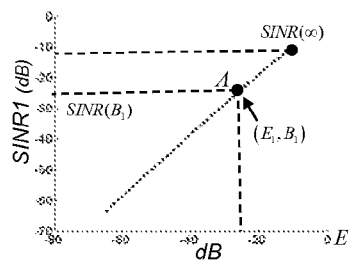
FIG. 6C shows a graph of signal to interference plus noise ratio versus energy for a flat target shown in FIG. 5A (dotted line)

FIG. 6C shows a graph of signal to interference plus noise ratio versus energy for a flat target shown in FIG. 5A (dotted line) using equations (34)-(35).

Figure 7:
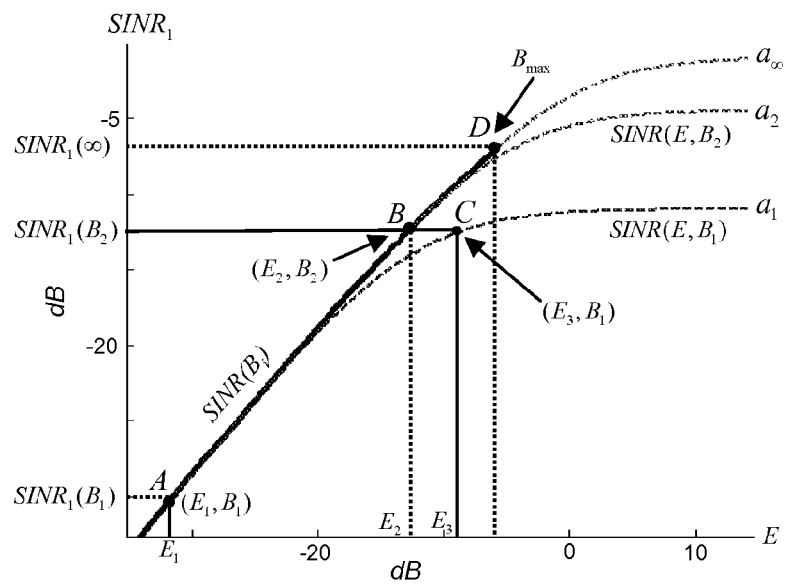
FIG. 7 shows a graph of signal to interference plus noise ratio versus energy and the Bandwidth-Energy swapping design.

FIG. 7 shows a graph of signal to interference plus noise ratio versus energy; generated using equations (39), (48), and (51).

Figure 8A:
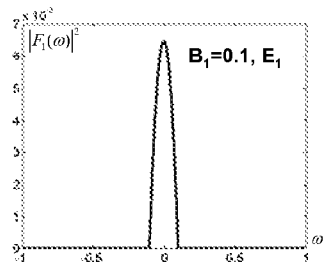
FIG. 8A shows a graph of the transform of the transmitter signal versus frequency corresponding to the design point A in FIG. 7.

FIG. 8A shows a graph of the transform of the transmitter signal versus frequency corresponding to the design point A in FIG. 7 generated using (42).

Figure 8B:
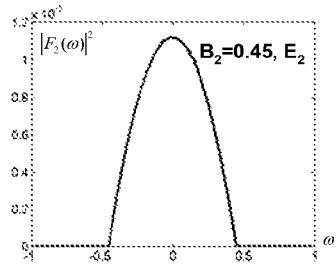
FIG. 8B shows a graph of the transform of the transmitter signal versus frequency corresponding to the design point B in FIG. 7.

FIG. 8B shows a graph of the transform of the transmitter signal versus frequency corresponding to the design point B in FIG. 7 generated using (42).

Figure 8C:
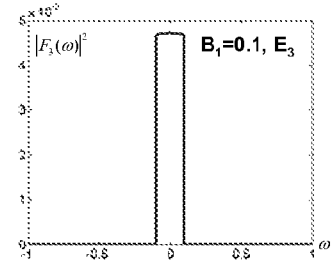
FIG. 8C shows a graph of the transform of the transmitter signal versus frequency corresponding to the design point C in FIG. 7.

FIG. 8C shows a graph of the transform of the transmitter signal versus frequency corresponding to the design point C in FIG. 7 generated using (42) for a third energy condition.

Figure 9:
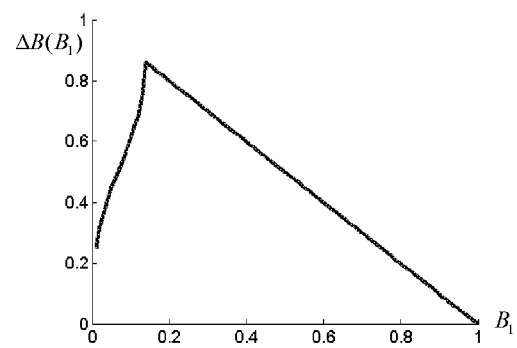
FIG. 9 is a graph of realizable bandwidth savings versus operating bandwidth.

FIG. 9 is a realizable bandwidth savings versus operating bandwidth generated using equation (60).

Define $\Omega_+$ as shown in FIGS. 3C and 3D to represent the frequencies over which $y^2(\omega)$ in equation (21) is strictly positive, and let $\Omega_o$ represent the complement of $\Omega_+$. As shown in FIGS. 3C and 3D, observe that the set $\Omega_+$ is a function of the noise and target spectral characteristics as well as the constraint constant $\lambda$. In terms of $\Omega_+$, we have $$|F(\omega)|^2 = \begin{cases} y^2(\omega), & \omega \in \Omega_+ \\ 0, & \omega \in \Omega_o. \end{cases} \quad (22)$$

From (21), $y^2(\omega)>0$ over $\Omega_+$ gives the necessary condition $$\lambda \geq \max_{\omega \in \Omega_+} \frac{\sqrt{G_n(\omega)}}{|Q(\omega)|} \quad (23)$$

and the energy constraint in (15) when applied to (21) gives $$E = \frac{1}{2\pi} \int_{\Omega_+} y^2(\omega) d\omega = \frac{\lambda}{2\pi} \int_{\Omega_+} \frac{\sqrt{G_n(\omega)} |Q(\omega)|}{G_c(\omega)} d\omega - \frac{1}{2\pi} \int_{\Omega_+} \frac{G_n(\omega)}{G_c(\omega)} d\omega \quad (24)$$

or, for a given value of E, we have $$\lambda = \frac{E + \frac{1}{2\pi} \int_{\Omega_+} \frac{G_n(\omega)}{G_c(\omega)} d\omega}{\frac{1}{2\pi} \int_{\Omega_+} \frac{\sqrt{G_n(\omega)} |Q(\omega)|}{G_c(\omega)} d\omega} \Box \lambda(E). \quad (25)$$

Clearly, $\lambda(E)$ in (25) must satisfy the inequality in (23) as well. This gives rise to the concept of transmitter energy threshold that is characteristic to this design approach.

Transmitter Threshold Energy

From (23)-(25), the transmit energy E must be such that $\lambda(E)$ obtained from (25) should satisfy (23). If not, E must be increased to accommodate it, and hence it follows that there exists a minimum threshold value for the transmit energy below which it will not be possible to maintain $|F(\omega)|^2>0$. This threshold value is given by $$E_{min} = \left( \max_{\omega \in \Omega_-} \frac{\sqrt{G_n(\omega)}}{|Q(\omega)|} \right) \frac{1}{2\pi} \int_{\Omega_+} \frac{\sqrt{G_n(\omega)} |Q(\omega)|}{G_c(\omega)} d\omega - \frac{1}{2\pi} \int_{\Omega_+} \frac{G_n(\omega)}{G_c(\omega)} d\omega \quad (26)$$

and for any operating condition, the transmit energy E must exceed $E_{min}$. Clearly, the minimum threshold energy depends on the target, clutter and noise characteristics as well as the bandwidth under consideration. With $E>E_{min}$, substituting (20)-(21) into the $SINR_{max}$ in (14) we get $$SINR_{max} = \frac{1}{2\pi} \int_{\Omega_+} \frac{|Q(\omega)|^2 y^2(\omega)}{\lambda \sqrt{G_n(\omega)} |Q(\omega)|} d\omega \qquad (27)$$

$$= \frac{1}{2\pi} \int_{\Omega_+} \frac{|Q(\omega)|}{\lambda(E) \sqrt{G_n(\omega)}}$$

$$\frac{\sqrt{G_n(\omega)} \left( \lambda(E) |Q(\omega)| - \sqrt{G_n(\omega)} \right)}{G_c(\omega)} d\omega$$

$$= \frac{1}{2\pi} \int_{\Omega_+} \left( |Q(\omega)| - \frac{\sqrt{G_n(\omega)}}{\lambda(E)} \right) \frac{|Q(\omega)|}{G_c(\omega)} d\omega.$$

Finally making use of (25), the output $SINR_{max}$ becomes $$SINR_1 = \frac{1}{2\pi} \int_{\Omega_+} \frac{|Q(\omega)|^2}{G_c(\omega)} d\omega - \frac{\left( \frac{1}{2\pi} \int_{\Omega_+} \frac{|Q(\omega)| \sqrt{G_n(\omega)}}{G_c(\omega)} d\omega \right)^2}{E + \frac{1}{2\pi} \int_{\Omega_+} \frac{G_n(\omega)}{G_c(\omega)} d\omega} \qquad (28)$$

$$= a - \frac{c}{\lambda(E)}$$

$$= a - \frac{c^2}{E + b}$$

$$= \frac{aE + (ab - c^2)}{E + b}$$

where $$a = \frac{1}{2\pi} \int_{\Omega_+} \frac{|Q(\omega)|^2}{G_c(\omega)} d\omega, \qquad (29)$$

$$b = \frac{1}{2\pi} \int_{\Omega_+} \frac{G_n(\omega)}{G_c(\omega)} d\omega, \qquad (30)$$

and $$c = \frac{1}{2\pi} \int_{\Omega_+} \frac{\sqrt{G_n(\omega)} |Q(\omega)|}{G_c(\omega)} d\omega. \qquad (31)$$

Notice that $ab - c^2 \geq 0$. (This was published in Waveform Diversity and Design conference, Kauai, Hi., January 2006).

The optimization problem in (14)-(15) can be restated in term of $\Omega_+$ as follows: Given $Q(\omega)$, $G_c(\omega)$, $G_n(\omega)$ and the transmit energy E, how to partition the frequency axis into an "operating band" $\Omega_+$ and a "no show" band $\Omega_o$ so that $\lambda_+$ obtained from (25) satisfies (23) and $SINR_{max}$ in (27)-(28) is also maximized. In general maximization of $SINR_{max}$ in (27)-(28) over $\Omega_+$ is a highly nonlinear optimization problem for arbitrary $Q(\omega)$, $G_c(\omega)$ and $G_n(\omega)$.

In what follows a new approach to this problem is presented.

An Embodiment of the Present Invention—Desired Band Approach

One approach in this situation is to make use of the "desired frequency band" of interest $B_0$ this is usually suggested by the target response $Q(\omega)$ (and the transmitter output filter) to determine the operating band $\Omega_+$. The desired band $B_0$ can represent a fraction of the total available bandwidth, or the whole bandwidth itself. The procedure for determining $\Omega_+$ is illustrated in FIGS. 3A-3C and FIGS. 3B-3D for two different situations. In FIGS. 3A-3D, the frequency band $B_0$ represents the desired band, and because of the nature of the noise and clutter spectra, it may be necessary to operate on a larger region $\Omega_+$ in the frequency domain. Thus the desired band $B_0$ is contained always within the operating band $\Omega_+$. To determine $\Omega_+$, using equation (23) we project the band $B_0$ onto the spectrum $\sqrt{G_n(\omega)}/|Q(\omega)|$ and draw a horizontal line corresponding to $$\lambda_{B_o} = \max_{\omega \in B_o} \frac{\sqrt{G_n(\omega)}}{|Q(\omega)|} \qquad (32)$$

as shown there. Define $\Omega_+(B_0)$ to represent the frequency region where $$\omega \in \Omega_+(B_o): \frac{\sqrt{G_n(\omega)}}{|Q(\omega)|} \leq \lambda_{B_o} = \max_{\omega \in B_o} \frac{\sqrt{G_n(\omega)}}{|Q(\omega)|}. \qquad (33)$$

This procedure can give rise to two situations as shown in FIG. 3A and FIG. 3B. In FIG. 3A, the operating band $\Omega_+(B_0)$ coincides with the desired band $B_0$ as shown in FIG. 3C, whereas in FIG. 3B, the desired band $B_0$ is a subset of $\Omega_+(B_0)$ as seen from FIG. 3D.

Knowing $\Omega_+(B_0)$, one can compute $\lambda = \lambda(E)$ with the help of equation (25) over that region, and examine whether $\lambda$ so obtained satisfies (23). If not, the transmitter energy E is insufficient to maintain the operating band $\Omega_+(B_0)$ given in (33), and either E must be increased, or $\Omega_+(B_0)$ must be decreased (by decreasing $B_0$) so that (23) is satisfied. Thus for a given desired band $B_0$ (or an operating band $\Omega_+(B_0)$), as remarked earlier, there exists a minimum transmitter threshold energy $E_{B_o}$, below which it is impossible to maintain $|F(\omega)|^2 > 0$ over that entire operating band.

Threshold Energy

From equations (24) and (32), we obtain the minimum transmitter threshold energy in this case to be the following $$E_{B_o} = \frac{\lambda_{B_o}}{2\pi} \int_{\Omega_+(B_o)} \frac{\sqrt{G_n(\omega)} |Q(\omega)|}{G_c(\omega)} d\omega - \qquad (34)$$

$$\frac{1}{2\pi} \int_{\Omega_+(B_o)} \frac{G_n(\omega)}{G_c(\omega)} d\omega$$

$$= \lambda_{B_o} c_o - b_o > 0.$$

With $E \geq E_{B_o}$, the $SINR_{max}$ a in (28) can be readily computed. In particular with $E = E_{B_o}$, we get $$SINR_1 = SINR_1(B_o) = a_o - \frac{c_o^2}{E_{B_o} + b_o}. \qquad (35)$$

Here $a_o$, $b_o$ and $c_o$ are as given in (29)-(31) with $\Omega_+$ replaced by $\Omega_+(B_0)$. Eq. (35) represents the performance level for bandwidth $B_0$ using its minimum threshold energy. From (21), we also obtain the optimum transmit signal transform corresponding to energy $E_{B_o}$ to be $$|F(\omega)|^2 = \begin{cases} \dfrac{\sqrt{G_n(\omega)}\left(\lambda_{B_o}|Q(\omega)| - \sqrt{G_n(\omega)}\right)}{G_c(\omega)}, & \omega \in \Omega_+(B_o) \\ 0, & \omega \in \Omega_o \end{cases} \quad (36)$$

$$= \begin{cases} \sqrt{G_n(\omega)}\left(\dfrac{\left(\max\limits_{\omega \in B_o}\dfrac{\sqrt{G_n(\omega)}}{|Q(\omega)|}\right) - \dfrac{\sqrt{G_n(\omega)}}{|Q(\omega)|}}{\dfrac{\sqrt{G_n(\omega)}}{|Q(\omega)|}}\right)\dfrac{|Q(\omega)|}{G_c(\omega)}, & \omega \in \Omega_+(B_o) \\ 0, & \omega \in \Omega_o \end{cases}$$

To summarize, to maintain a given desired band $B_0$, there exists an operating band $\Omega_+(B_0) \supseteq B_0$ over which $|F(\omega)|^2 < 0$ and to guarantee this, the transmit energy must exceed a minimum threshold value $E_{B_o}$ given by (34).

FIGS. 4A-F shows the transmitter threshold energy E in (34) and the corresponding SINR in (35) as a function of the desired bandwidth $B_0$ for various target, clutter, and noise spectra. Target to noise ratio (TNR) is set at 0 dB, and the clutter to noise power ratio (CNR) is set at 20 dB here. The total noise power is normalized to unity. The desired bandwidth $B_0$ is normalized with respect to the maximum available bandwidth (e.g., carrier frequency).

In FIGS. 4A-F, the noise and clutter have flat spectra and for the highly resonant target (solid line), the required minimum energy threshold and the SINR generated using (34)-(35) reach a saturation value for small values of the bandwidth. In the case of the other two targets, additional bandwidth is required to reach the maximum attainable SINR. This is not surprising since for the resonant target, a significant portion of its energy is concentrated around the resonant frequency. Hence once the transmit signal bandwidth reaches the resonant frequency, it latches onto the target features resulting in maximum SINR at a lower bandwidth.

FIGS. 5A-F show results for a new set of clutter and noise spectra as shown there; the transmitter threshold energy E in (34) and the corresponding SINR in (35) as a function of the desired bandwidth $B_0$ show similar performance details.

From FIG. 5F, in the case of the resonant target (solid curve) the SINR reaches its peak value resulting in saturation even when $B_0$ is a small fraction of the available bandwidth. This is because in that case, the transmit waveform is able to latch onto the dominant resonant frequency of the target. On the other extreme, when the target has flat characteristics (dotted curve), there are no distinguishing frequencies to latch on, and the transmitter is unable to attain the above maximum SINR even when $B_0$ coincides with the total available bandwidth. For a low pass target (dashed curve), the transmitter is indeed able to deliver the maximum SINR by making use of all the available bandwidth.

As FIG. 3B shows, $\Omega_+(B_0)$ can consist of multiple disjoint frequency bands whose complement $\Omega_o$ represents the "no show" region. Notice that the "no show" region $\Omega_o$ in the frequency domain in (36) for the optimum transmit signal can be controlled by the transmit energy E in (25). By increasing E, these "no show" regions can be made narrower and this defines a minimum transmitter threshold energy $E_\infty$ that allows $\Omega_+(B_0)$ to be the entire available frequency axis. To determine $E_\infty$, let $\lambda_\infty$ represent the maximum in (23) over the entire frequency axis. Thus $$\lambda_\infty = \max_{|\omega| < \infty} \dfrac{\sqrt{G_n(\omega)}}{|Q(\omega)|}, \quad (37)$$

and let $a_\infty$, $b_\infty$, $c_\infty$ refer to the constants a, b, c in (29)-(31) calculated with $\Omega_+$ representing the entire frequency axis. Then from (24)

$$E_\infty = \lambda_\infty c_\infty - b_\infty = \quad (38)$$

$$\dfrac{\lambda_\infty}{2\pi}\int_{-\infty}^{+\infty}\dfrac{\sqrt{G_n(\omega)}|Q(\omega)|}{G_c(\omega)}d\omega - \dfrac{1}{2\pi}\int_{-\infty}^{+\infty}\dfrac{G_n(\omega)}{G_c(\omega)}d\omega > 0$$

represents the minimum transmit energy (threshold) required to avoid partitioning in the frequency domain. With $E_\infty$ as given by (38), we obtain $SINR_{max}$ to be (use (28))

$$SINR_1(\infty) = a_\infty - \dfrac{c_\infty^2}{\lambda_\infty} = a_\infty - \dfrac{c_\infty^2}{E_\infty + b_\infty} > 0 \quad (39)$$

and $$|F(\omega)|^2 = \dfrac{\sqrt{G_n(\omega)}\left(\lambda_\infty|Q(\omega)| - \sqrt{G_n(\omega)}\right)}{G_c(\omega)}, \quad (40)$$

$$|\omega| < \infty.$$

Clearly by further increasing the transmit energy in (39) beyond that in (38) we obtain $$SINR_1 \to a_\infty = \dfrac{1}{2\pi}\int_{-\infty}^{-\infty}\dfrac{|Q(\omega)|^2}{G_c(\omega)}d\omega. \quad (41)$$

It follows that to avoid any restrictions in the frequency domain for the transmit signal, the transmitter energy E must exceed a minimum threshold value $E_\infty$ given by (38) and (39) represents the maximum realizable SNR. By increasing E beyond $E_\infty$, the performance can be improved up to that in (41).

In general from (34) for a given desired bandwidth $B_0$, the transmit energy E must exceed its threshold value $E_{B_o}$. With $E > E_{B_o}$ and $\lambda(E)$ as in (25), the corresponding optimum transmit signal transform is given by (see (21) (22))

$$|F(\omega)|^2 = \begin{cases} \dfrac{\sqrt{G_c(\omega)}\left(\lambda(E)|(\omega)| - \sqrt{G_n(\omega)}\right)}{G_c(\omega)}, & \omega \in \Omega_+(B_o) \\ 0, & \omega \in \Omega_o \end{cases} \quad (42)$$

and clearly this signal is different from the minimum threshold energy one in (36). From (28), the performance level $SINR_1(E, B_0)$ corresponding to (42) is given by (35) with $E_{B_o}$ replaced by E. Thus $$SINR_1(E, B_o) = a_o - \frac{c_o^2}{E + b_o} > SINR_1(B_o). \quad (43)$$

From (43), for a given bandwidth $B_0$, performance can be increased beyond that in (35) by increasing the transmit energy. Hence it follows that $SINR_1(B_0)$ represents the minimum performance level for bandwidth $B_0$ that is obtained by using its minimum threshold energy. It is quite possible that this improved performance $SINR_1(E, B_0)$ can be equal to the minimum performance level corresponding to a higher bandwidth $B_1 > B_0$. This gives rise to the concept of Energy-Bandwidth tradeoff at a certain performance level. Undoubtedly this is quite useful when bandwidth is at premium.

FIGS. 5E-5F exhibit the transmit threshold energy and maximum output $SINR_1(B_0)$ as a function of the desired bandwidth $B_0$. Combining these figures using (35), an SINR vs. transmit threshold energy plot can be generated as in FIGS. 6A-C for each target situation.

For example, FIG. 6A-C corresponds to the three different target situations considered in FIG. 5 with clutter and noise spectra as shown there. Notice that each point on the SINR-Energy threshold curve for each target is associated with a specific desired bandwidth. Thus for bandwidth $B_1$, the minimum threshold energy required is $E_1$, and the corresponding SINR equals $SINR_1(B_1)$ in (35). Let A represent the associated operating point in FIG. 6. Note that the operating point A corresponding to a bandwidth $B_1$ has different threshold energies and different performance levels for different targets. From (35), each operating point generates a distinct transmit waveform. As the bandwidth increases, from (39), $SINR \to SINR_1(\infty)$.

Monotonic Property of SINR

The threshold energy and SINR associated with a higher bandwidth is higher. To prove this, consider two desired bandwidths $B_1$ and $B_2$ with $B_2 > B_1$. Then from (32) we have $$\lambda_2 = \max_{\omega \in B_2} \frac{\sqrt{G_n(\omega)}}{|Q(\omega)|} > \lambda_1 = \max_{\omega \in B_1} \frac{\sqrt{G_n(\omega)}}{|Q(\omega)|}, \quad (44)$$

and from FIG. 3, the corresponding operating bandwidths $\Omega_+(B_1)$ and $\Omega_+(B_2)$ satisfy $$\Omega_+(B_2) \geq \Omega_+(B_1). \quad (45)$$

From (34) (or (24)), the minimum threshold energies are given by $$E_i = \frac{1}{2\pi} \int_{\Omega_+(B_i)} \sqrt{G_n(\omega)} \left( \lambda_i - \frac{\sqrt{G_n(\omega)}}{Q(\omega)} \right) \frac{|Q(\omega)|}{G_c(\omega)} d\omega, \quad (46)$$

$i = 1, 2$ and substituting (44) and (45) into (46) we get $$E_2 > E_1. \quad (47)$$

Also from (27), the performance levels at threshold energy $SINR_1(B_i)$ equals $$SINR_1(B_i) = \frac{1}{2\pi} \int_{\Omega_+(B_i)} \left( |Q(\omega)| - \frac{\sqrt{G_n(\omega)}}{\lambda_i} \right) \frac{|Q(\omega)|}{G_c(\omega)} d\omega \quad (48)$$

and an argument similar to (44)-(45) gives $$SINR_1(B_2) \geq SINR_1(B_1) \quad (49)$$

for $B_2 > B_1$. Thus as FIGS. 5A-F-FIGS. 6A-C show, $SINR_1(B_i)$ is a monotonically nondecreasing function of both bandwidth and energy. FIG. 7 illustrates this SINR-energy relation for the target with flat spectrum shown in FIG. 5A. In FIG. 7, the two operating points A and B are associated with bandwidths $B_1$ and $B_2$, threshold energies $E_1$ and $E_2$, and performance levels $SINR_1(B_1)$ and $SINR_1(B_2)$ respectively.

Since $$B_2 > B_1 \Rightarrow E_2 \geq E_1 \text{ and } SINR_1(B_2) \geq SINR_1(B_1). \quad (50)$$

The distinct transmit waveforms $|F_1(\omega)|^2$ and $|F_2(\omega)|^2$ associated with these operating point A and B are given by (36) and they are shown in FIGS. 8A and 8B.

Consider the operating point A associated with the desired bandwidth $B_1$. If the transmit energy E is increased beyond the corresponding threshold value $E_1$ with bandwidth held constant at $B_1$, the performance $SINR_1(E, B_1)$ increases beyond that at A since from (43)

$$SINR_1(E, B_1) = a_1 - \frac{c_1^2}{E + b_1} \geq a_1 - \frac{c_1^2}{E_1 + b_1} = SINR_1(B_1) \quad (51)$$

and it is upper bounded by $a_1$. Here $a_1$ corresponds to the SINR performance for bandwidth $B_1$ as the transmit energy $E \to \infty$. Note that $a_1$, $B_1$ and $c_1$ are the constants in (29)-(31) with $\Omega_+$ replaced by $\Omega_+(B_1)$. The dashed curve $Aa_1$ in FIG. 7 represents $SINR_1(E, B_1)$ for various values of E. From (42), each point on the curve $Aa_1$ generates a new transmit waveform as well.

Interestingly the dashed curves in FIG. 7 cannot cross over the optimum performance (solid) curve $SINR(B_i)$. If not, assume the performance $SINR_1(E, B_1)$ associated with the operating point A crosses over $SINR(B_i)$ at some $E_1' > E_1$. Then from (47), there exists a frequency point $B_1' > B_1$ with threshold energy $E_1'$ and optimum performance $SINR_1(B_1')$. By assumption, $$SINR_1(E_1', B_1) > SINR_1(B_1'). \quad (52)$$

But this is impossible since $SINR_1(B_1')$ corresponds to the maximum SINR realizable at bandwidth $B_1'$ with energy $E_1'$, and hence performance at a lower bandwidth $B_1$ with the same energy cannot exceed it. Hence (52) cannot be true and we must have $$SINR_1(E_1', B_1) \leq SINR_1(B_1'), \quad (53)$$

i.e., the curves $Aa_1$, $Ba_2$, etc. does not cross over the optimum performance curve ABD.

In FIG. 7, assume that the saturation performance value $$a_1 \geq SINR_1(B_2), \quad (54)$$

i.e., the maximum performance level for bandwidth $B_1$ is greater than of equal to the performance level associated with the operating point B with a higher bandwidth $B_2$ and a higher threshold energy $E_2$. Draw a horizontal line through B to intersect the curve $Aa_1$ at C, and drop a perpendicular at C to intersect the x-axis at $E_3$. From (51) with $E=E_3$ we get $$SINR_1(E_3,B_1)=SINR_1(B_2). \tag{55}$$

Thus the operating point C on the curve $Aa_1$ is associated with energy $E_3$, bandwidth $B_1$ and corresponds to a performance level of $SINR_1(B_2)$ associated with a higher bandwidth. Notice that $$E_3 > E_2 > E_1, \text{ and } B_1 < B_2. \tag{56}$$

In other words, by increasing the transmit energy from $E_1$ to $E_3$ while holding the bandwidth constant at $B_1$, the performance equivalent to a higher bandwidth $B_2$ can be realized provided $B_2$ satisfies (54). As a result, energy-bandwidth tradeoff is possible within reasonable limits. The transmit waveform $|F_3(\omega)|^2$ associated with the operating point C is obtained using (42) by replacing E and $B_0$ there with $E_3$ and $B_1$ respectively. and it is illustrated in FIG. 8C. In a similar manner, the waveforms corresponding to the operating points A and B in FIG. 7 can be obtained using equation (42) by replacing the energy-bandwidth pair $(E,B_0)$ there with $(E_1,B_1)$ and $(E_2,B_2)$ respectively. These waveforms are shown in FIG. 8A and FIG. 8B respectively A comparison with FIGS. 8A and 8B show that the waveform at C is different from those associated with operating point A and B.

It is important to note that although the transmit waveform design $|F_3(\omega)|^2$ and $|F_1(\omega)|^2$ correspond to the same bandwidth (with different energies $E_3$ and $E_1$), one is not a scaled version of the other. Changing transmit energy from $E_1$ to $E_3$ unleashes the whole design procedure and ends up in a new waveform $|F_3(\omega)|^2$ that maintains a performance level associated with a larger bandwidth $B_2$.

The question of how much bandwidth tradeoff can be achieved at an operating point is an interesting one. From the above argument, equality condition in (54) gives the upper bound on how much effective bandwidth increment can be achieved by increasing the transmit energy. Notice that for an operating point A, the desired bandwidth $B_1$ gives the operating bandwidth $\Omega_+(B_1)$ and from (29) the performance limit $$a_1 = \frac{1}{2\pi} \int_{\Omega_+(B_1)} \frac{|Q(\omega)|^2}{G_c(\omega)} d\omega \tag{57}$$

for bandwidth $B_1$ can be computed. Assume $B_2 > B_1$, and from (48) $SINR_1(B_2)$ the minimum performance at $B_2$ also can be computed, and for maximum bandwidth swapping the nonlinear equation $$a_1 = SINR_1(B_2) \tag{58}$$

must be solved for $B_2$. Then $$\Delta B(B_1) = B_2 - B_1 \tag{59}$$

represents the maximum bandwidth enhancement that can be realized at $B_1$. This is illustrated in for the target situation in FIG. 7. Notice that the maximum operating bandwidth if finite in any system due to sampling considerations and after normalization, it is represented by unity. Hence the upper limit in (59) must be $\min(1, B_2)$. This gives $$\Delta B = \min(1, B_2) - B_1 \tag{60}$$

and this explains the linear nature of $\Delta B$ for larger value of $B_i$. In that case, bandwidth can be enhanced by $1-B_1$ only.

The design approach described in this section requires the knowledge of the target characteristics in addition to the clutter and noise spectra.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising
providing a transmitter and a receiver;
selecting a desired bandwidth $B_o$ for a transmit signal f(t);
outputting the transmit signal f(t) from the transmitter towards a target and towards interference,
wherein the target produces a target signal;
and further comprising receiving a combination signal at the receiver, wherein the combination signal includes noise and the transmit signal f(t) modified by interacting with the target and the interferences,
acting on the combination signal using the receiver to form a receiver output signal,
wherein the transmit signal f(t) is selected and the receiver is configured so that the ratio of the receiver output signal to interference plus noise power is maximized while maintaining the desired bandwidth $B_o$ for the receiver output signal, and
wherein the Fourier transform $F(\omega)$ of the transmit signal f(t) is given by:

$$|F(\omega)|^2 = \begin{cases} \sqrt{G_n(\omega)}\left(\left[\max_{\omega \in B_o} \frac{\sqrt{G_n(\omega)}}{|Q(\omega)|}\right] - \frac{\sqrt{G_n(\omega)}}{|Q(\omega)|}\right)\frac{|Q(\omega)|}{G_c(\omega)}, & \omega \in \Omega_+(B_o) \\ 0, & \omega \in \Omega_o \end{cases}$$

wherein
$B_o$ is the desired bandwidth of the transmit signal f(t);
$Q(\omega)$ is the target signal Fourier transform;
$G_c(\omega)$ is the interference spectrum;
$G_n(\omega)$ is the noise spectrum;
$\Omega_0$ is complementary region in the frequency to $\Omega_+(B_0)$ and
$\Omega_+(B_0)$ represents the frequency region where the following inequality is satisfied:

$$\frac{\sqrt{G_n(\omega)}}{|Q(\omega)|} \leq \max_{\omega \in B_o} \frac{\sqrt{G_n(\omega)}}{|Q(\omega)|}.$$

2. The method of claim 1 further comprising
selecting a receiver filter for the receiver such that the receiver filter has a Fourier transform $H_{opt}(\omega)$ is given by $$H_{opt}(\omega) = \frac{Q^*(\omega)F^*(\omega)}{G_c(\omega)|F(\omega)|^2 + G_n(\omega)} e^{-j\omega t_o}$$

wherein $t_o$ is a decision instant at which the target signal is to be detected.

3. The method of claim 1 wherein
the transmit signal f(t) so generated has a minimum energy given by the threshold value $E_{min}$ where $$E_{\min} = \left( \max_{\omega \in \Omega_+(B_0)} \frac{\sqrt{G_n(\omega)}}{|Q(\omega)|} \right) \frac{1}{2\pi} \int_{\Omega_+(B_0)} \frac{\sqrt{G_n(\omega)} |Q(\omega)|}{G_c(\omega)} d\omega - \frac{1}{2\pi} \int_{\Omega_+(B_0)} \frac{G_n(\omega)}{G_c(\omega)} d\omega.$$

4. A method comprising providing a transmitter and a receiver;

selecting a desired bandwidth $B_1$ for a transmit signal f(t);

selecting a desired energy E that exceeds a predetermined energy level $E_{min}$ given below;

outputting the transmit signal f(t) from the transmitter towards a target and towards interference, wherein the target produces a target signal;

and further comprising receiving a combination signal at the receiver, wherein the combination signal includes noise and the transmit signal f(t) modified by interacting with the target and the interference, wherein the receiver acts on the combination signal to form a receiver output signal, wherein the transmit signal f(t) is selected and the receiver is configured so that the ratio of the receiver output signal to interference plus noise power is maximized while maintaining the desired bandwidth $B_1$ for the receiver output signal, and wherein $$E_{\min} = \left( \max_{\omega \in \Omega_+(B_1)} \frac{\sqrt{G_n(\omega)}}{|Q(\omega)|} \right) \frac{1}{2\pi} \int_{\Omega_+(B_1)} \frac{\sqrt{G_n(\omega)} |Q(\omega)|}{G_c(\omega)} d\omega - \frac{1}{2\pi} \int_{\Omega_+(B_1)} \frac{G_n(\omega)}{G_c(\omega)} d\omega,$$

and wherein the Fourier transform $F(\omega)$ of the transmit signal f(t) is given by $$|F(\omega)|^2 = \begin{cases} \dfrac{\sqrt{G_n(\omega)} \left( \lambda(E) |Q(\omega)| - \sqrt{G_n(\omega)} \right)}{G_c(\omega)}, & \omega \in \Omega_+(B_1) \\ 0, & \omega \in \Omega_o \end{cases}$$

wherein $$\lambda(E) = \frac{E + \dfrac{1}{2\pi} \int_{\Omega_+(B_1)} \dfrac{G_n(\omega)}{G_c(\omega)} d\omega}{\dfrac{1}{2\pi} \int_{\Omega_+(B_1)} \dfrac{\sqrt{G_n(\omega)} |Q(\omega)|}{G_c(\omega)} d\omega}.$$

and wherein $B_1$ is the desired bandwidth of the transmit signal f(t);

E is the prescribed energy of the transmit signal f(t);

$Q(\omega)$ is the target signal Fourier transform;

$G_c(\omega)$ is the interference spectrum;

$G_n(\omega)$ is the noise spectrum;

$\Omega_0$ is complementary region in the frequency to $\Omega_+(B_1)$ and $\Omega_+(B_1)$ represents the frequency region where the following inequality is satisfied:

$$\frac{\sqrt{G_n(\omega)}}{|Q(\omega)|} \le \max_{\omega \in B_1} \frac{\sqrt{G_n(\omega)}}{|Q(\omega)|}.$$

5. The method of claim 1 wherein
the interference and the noise are part of a space based radar scene.

6. The method of claim 1 wherein
the interference and the noise are part of an airborne based radar scene.

7. The method of claim 1 wherein
the interference and the noise are part of a ground based radar scene.

8. The method of claim 1 wherein
the interference and the noise are part of an underwater sonar scene.

9. The method of claim 1 wherein
the transmit signal f(t), the target, the interference, and the noise are part of a cellular communication scene (ground based and/or space based) wherein the transmit signal f(t) represents the desired voice or data modulated signal, the target represents the channel, and the interference represents all interference signals.

10. A method comprising providing a transmitter and a receiver;

outputting a first transmit signal f(t) from the transmitter towards a target, wherein the target produces a first target signal when the first transmit signal interacts with the target, wherein the first transmit signal f(t) has a first transmit signal bandwidth, a first transmit signal energy, and a first transmit signal waveform, and further comprising receiving a first combination signal at the receiver, wherein the first combination signal includes a first noise signal, a first interference signal, and a first return signal which is the first transmit signal returned back from the target disregarding any effects of noise or interference, acting on the first combination signal using the receiver to form a first receiver output signal, wherein the first receiver output signal has a first receiver output signal waveform; and further comprising wherein the first transmit signal has a first performance level which is a ratio of the first receiver output signal to the first interference signal plus the first noise signal;

outputting a second transmit signal from the transmitter towards the target, wherein the second transmit signal has a second transmit signal bandwidth, a second transmit signal energy, and a second transmit signal waveform, and further comprising receiving a second combination signal at the receiver, wherein the second combination signal includes a second noise signal, a second interference signal, and a second return signal which is the second transmit signal returned back from the target disregarding any effects of noise or interference;

acting on the second combination signal using the receiver to form a second receiver output signal, wherein the second receiver output signal has a second receiver output signal waveform, wherein the second transmit signal bandwidth and the first transmit signal bandwidth are different, wherein the second transmit signal energy and the first transmit signal energy are different, wherein if the second transmit signal bandwidth is higher than the first transmit signal bandwidth, then the second transmit signal energy will be lower than the first transmit signal energy, wherein if the second transmit signal bandwidth is lower than the first transmit signal bandwidth, then the second transmit signal energy will be higher than the first transmit signal energy, wherein the second transmit signal has a second performance level which is a ratio of the second receiver output signal to the second interference signal plus the second noise signal, and wherein the first performance level is substantially the same as second performance level.

11. The method of claim 10 further comprising selecting an initial desired first bandwidth $B_1$ for the first transmit signal bandwidth and determining the first transmit signal energy $E_1$ for the first transmit signal according to $$E_1 = \frac{1}{2\pi} \int_{\Omega_+(B_1)} \sqrt{G_n(\omega)} \left( \lambda_1 - \frac{\sqrt{G_n(\omega)}}{Q(\omega)} \right) \frac{|Q(\omega)|}{G_c(\omega)} d\omega$$

wherein $$\lambda_1 = \max_{\omega \in B_1} \frac{\sqrt{G_n(\omega)}}{|Q(\omega)|},$$

and determining the first performance level for an energy-bandwidth pair $(E_1, B_1)$, wherein the first performance level is given by $$SINR_1(B_1) = \frac{1}{2\pi} \int_{\Omega_+(B_1)} \left( |Q(\omega)| - \frac{\sqrt{G_n(\omega)}}{\lambda_1} \right) \frac{|Q(\omega)|}{G_c(\omega)} d\omega.$$

wherein $Q(\omega)$ is a Fourier transform of the first target signal;

$G_c(\omega)$ is a spectrum of the first interference signal;

$G_n(\omega)$ is a spectrum of the first noise signal; and $\Omega_+(B_1)$ represents a frequency region where the following inequality is satisfied:

$$\frac{\sqrt{G_n(\omega)}}{|Q(\omega)|} \leq \max_{\omega \in B_1} \frac{\sqrt{G_n(\omega)}}{|Q(\omega)|}.$$

12. The method of claim 11 further comprising selecting the second transmit signal bandwidth $B_2$ larger than the first transmit signal bandwidth $B_1$ so as to satisfy the condition $$SINR_1(B_2) \leq \frac{1}{2\pi} \int_{\Omega_+ B_1} \frac{|Q(\omega)|^2}{G_c(\omega)} d\omega,$$

and for which the second transmit signal energy $E_2$ and the second performance level $SINR_1(B_2)$ are determined as follows $$E_2 = \frac{1}{2\pi} \int_{\Omega_+(B_2)} \sqrt{G_n(\omega)} \left( \lambda_2 - \frac{\sqrt{G_n(\omega)}}{Q(\omega)} \right) \frac{|Q(\omega)|}{G_c(\omega)} d\omega$$

and $$SINR_1(B_2) = \frac{1}{2\pi} \int_{\Omega_+(B_2)} \left( |Q(\omega)| - \frac{\sqrt{G_n(\omega)}}{\lambda_2} \right) \frac{|Q(\omega)|}{G_c(\omega)} d\omega.$$

where $\lambda_2 = \max_{\omega \in B_2} \frac{\sqrt{G_n(\omega)}}{|Q(\omega)|}$, and $\Omega_+(B_2)$ represents the frequency region where the following inequality is satisfied:

$$\frac{\sqrt{G_n(\omega)}}{|Q(\omega)|} \leq \max_{\omega \in B_2} \frac{\sqrt{G_n(\omega)}}{|Q(\omega)|};$$

and further comprising determining a new energy level $E_3$ that satisfies the identity $$SINR_1(E_3, B_1) = a_1 - \frac{c_1^2}{E_3 + b_1} = SINR_1(B_2),$$

where $$a_1 = \frac{1}{2\pi} \int_{\Omega_+(B_1)} \frac{|Q(\omega)|^2}{G_c(\omega)} d\omega,$$

$$b_1 = \frac{1}{2\pi} \int_{\Omega_+(B_1)} \frac{G_n(\omega)}{G_c(\omega)} d\omega,$$

$$c_1 = \frac{1}{2\pi} \int_{\Omega_+(B_1)} \frac{\sqrt{G_n(\omega)} |Q(\omega)|}{G_c(\omega)} d\omega.$$

outputting a third transmit signal from the transmitter towards the target, wherein the third transmit signal has a third transmit signal bandwidth, a third transmit signal energy which is the new energy level $E_3$, and a third transmit signal waveform, and further comprising receiving a third combination signal at the receiver, wherein the third combination signal includes a third noise signal, a third interference signal, and a third return signal which is the third transmit signal returned back from the target disregarding any effects of noise or interference;

acting on the third combination signal using the receiver to form a third receiver output signal, wherein the third receiver output signal has a third receiver output signal waveform, wherein the third transmit signal bandwidth and the second transmit signal bandwidth are different, wherein the third transmit signal energy and the second transmit signal energy are different, wherein if the third transmit signal bandwidth is higher than the second transmit signal bandwidth, then the third transmit signal energy will be lower than the second transmit signal energy, wherein if the third transmit signal bandwidth is lower than the second transmit signal bandwidth, then the third transmit signal energy will be higher than the second transmit signal energy, wherein the third transmit signal has a third performance level which is a ratio of the third receiver output signal to the third interference signal plus the third noise signal, and wherein the third performance level is substantially the same as second performance level.

13. The method of claim 12 further comprising
constructing the first transmit signal having a first transmit signal waveform;
constructing the second transmit signal having a second transmit signal waveform,
wherein the first transmit signal is different from the second transmit signal and the first transmit signal waveform is different from the second transmit signal waveform;
wherein the first transmit signal bandwidth is $B_1$,
wherein the first transmit signal energy is $E_1$,
wherein the third transmit signal bandwidth is $B_2$,
wherein the third transmit signal energy is $E_3$,
wherein the first transmit signal has a fourier transform given by $$|F(\omega)|^2 = \begin{cases} \sqrt{G_n(\omega)}\left(\left(\max_{\omega \in B_2} \frac{\sqrt{G_n(\omega)}}{|Q(\omega)|}\right) - \frac{\sqrt{G_n(\omega)}}{|Q(\omega)|}\right)\frac{|Q(\omega)|}{G_c(\omega)}, & \omega \in \Omega_+(B_2) \\ 0, & \text{otherwise} \end{cases} ;$$

wherein the third transmit signal has a fourier transform given by $$|F(\omega)|^2 = \begin{cases} \frac{\sqrt{G_n(\omega)}\left(\lambda(E_3)|Q(\omega)| - \sqrt{G_n(\omega)}\right)}{G_c(\omega)}, & \omega \in \Omega_+(B_1) \\ 0, & \omega \in \Omega_o \end{cases}$$

wherein $$\lambda(E_3) = \frac{E_3 + \frac{1}{2\pi}\int_{\Omega_+(B_1)} \frac{G_n(\omega)}{G_c(\omega)}d\omega}{\frac{1}{2\pi}\int_{\Omega_+(B_1)} \frac{\sqrt{G_n(\omega)}|Q(\omega)|}{G_c(\omega)}d\omega}.$$

and wherein the first and third transmit signals have the same performance level $SINR_1(B_2)$, in terms of target detection in interference and noise, when used in conjunction with the receiver,
wherein the receiver has a receiver filter which that performs a Fourier transform on the first combination signal to form the first receiver output signal and performs a Fourier transform on the third combination signal to form the third receiver output signal, wherein the Fourier transform performed by the receiver filter, $H_{opt}(\omega)$, is given by $$H_{opt}(\omega) = \frac{Q*(\omega)F*(\omega)}{G_c(\omega)|F(\omega)|^2 + G_n(\omega)}e^{-j\omega t_o}$$

wherein $t_o$ is a decision instant at which the first target signal is to be detected.

14. The method of claim 10 wherein
the first transmit signal f(t), the target, the first interference signal, and the first noise signal are part of a cellular communication scene where the first transmit signal f(t) represents the desired voice or data modulated signal, the target represents the channel, and the first interference signal represents all interference signals in the first combination signal.

15. The method of claim 10 wherein
the first interference signal and the first noise signal are part of a space based radar scene.

16. The method of claim 10 wherein
the first interference and the first noise signal are part of an airborne based radar scene.

17. The method of claim 10 wherein
the first interference signal and the first noise signal are part of a ground based radar scene.

18. The method of claim 10 wherein
the first interference signal and the first noise signal are part of an underwater sonar scene.

19. An apparatus comprising
a transmitter; and
a receive,
wherein the transmitter is configured to transmit a transmit signal f(t) of a bandwidth $B_0$ towards a target and towards interferences,
wherein the target produces a target signal,
wherein the receiver is configured to receive a combination signal, wherein the combination signal includes noise and the transmit signal f(t) modified by interacting with the target and the interferences,
wherein the receiver is configured to act on the combination signal to form a receiver output signals,
wherein the transmit signal f(t) is selected and the receiver is configured so that the ratio of the receiver output signal to interference plus noise power is maximized while maintaining the bandwidth $B_0$ for the receiver output signals, and
wherein the Fourier transform $F(\omega)$ of the transmit signal f(t) is given by:

$$|F(\omega)|^2 = \begin{cases} \sqrt{G_n(\omega)}\left(\left[\max_{\omega \in B_o} \frac{\sqrt{G_n(\omega)}}{|Q(\omega)|}\right] - \frac{\sqrt{G_n(\omega)}}{|Q(\omega)|}\right)\frac{|Q(\omega)|}{G_c(\omega)}, & \omega \in \Omega_+(B_o) \\ 0, & \omega \in \Omega_o \end{cases}$$

wherein
$B_0$ is the desired bandwidth of the transmit signal f(t);
$Q(\omega)$ is the target signal Fourier transform;
$G_c(\omega)$ is the interference spectrum;
$G_n(\omega)$ is the noise spectrum;
$\Omega_0$ is complementary region in the frequency to $\Omega_+(B_0)$ and
$\Omega_+(B_0)$ represents the frequency region where the following inequality is satisfied:

$$\frac{\sqrt{G_n(\omega)}}{|Q(\omega)|} \leq \max_{\omega \in B_o} \frac{\sqrt{G_n(\omega)}}{|Q(\omega)|}.$$

20. The apparatus of claim 19 further comprising
a receiver filter which is part of the receivers,
and wherein the receiver filter is configured to have a Fourier transform $H_{opt}(\omega)$ which is given by $$H_{opt}(\omega) = \frac{Q^*(\omega)F^*(\omega)}{G_c(\omega)|F(\omega)|^2 + G_n(\omega)}e^{-j\omega t_o}$$

wherein $t_o$ is a decision instant at which the target signal is to be detected.

21. The apparatus of claim 19 wherein
the transmit signal f(t) has a minimum energy given by the threshold value $E_{min}$ where $$E_{min} = \left(\max_{\omega \in \Omega_+(B_0)} \frac{\sqrt{G_n(\omega)}}{|Q(\omega)|}\right) \frac{1}{2\pi} \int_{\Omega_+(B_0)} \frac{\sqrt{G_n(\omega)}|Q(\omega)|}{G_c(\omega)} d\omega - \frac{1}{2\pi} \int_{\Omega_+(B_0)} \frac{G_n(\omega)}{G_c(\omega)} d\omega$$

22. An apparatus comprising
a transmitter; and
a receive,
wherein the transmitter is configured to output a transmit signal f(t) having a bandwidth $B_1$ and an energy E that exceeds a predetermined energy level $E_{min}$ given below,
wherein the transmitter is configured to output the transmit signal f(t) towards a target and towards interferences,
wherein the target produces a target signals,
wherein the receiver is configured to receive a combination signal at the receiver, wherein the combination signal includes noise and the transmit signal f(t) modified by interacting with the target and the interference,
wherein the receiver is configured to act on the combination signal to form a receiver output signal,
wherein the transmit signal f(t) is selected and the receiver is configured so that the ratio of the receiver output signal to interference plus noise power is maximized while maintaining the bandwidth $B_1$ for the receiver output signal, and
wherein $$E_{min} = \left(\max_{\omega \in \Omega_+(B_1)} \frac{\sqrt{G_n(\omega)}}{|Q(\omega)|}\right) \frac{1}{2\pi} \int_{\Omega_+(B_1)} \frac{\sqrt{G_n(\omega)}|Q(\omega)|}{G_c(\omega)} d\omega - \frac{1}{2\pi} \int_{\Omega_+(B_1)} \frac{G_n(\omega)}{G_c(\omega)} d\omega,$$

and wherein the Fourier transform $F(\omega)$ of the transmit signal f(t) is given by $$|F(\omega)|^2 = \begin{cases} \frac{\sqrt{G_n(\omega)}\left(\lambda(E)|Q(\omega)| - \sqrt{G_n(\omega)}\right)}{G_c(\omega)}, & \omega \in \Omega_+(B_1) \\ 0, & \omega \in \Omega_o \end{cases}$$

wherein $$\lambda(E) = \frac{E + \frac{1}{2\pi}\int_{\Omega_+(B_1)} \frac{G_n(\omega)}{G_c(\omega)} d\omega}{\frac{1}{2\pi}\int_{\Omega_+(B_1)} \frac{\sqrt{G_n(\omega)}|Q(\omega)|}{G_c(\omega)} d\omega}$$

and wherein
$B_1$ is the desired bandwidth of the transmit signal f(t);
E is the prescribed energy of the transmit signal f(t);
$Q(\omega)$ is the target signal Fourier transform;
$G_c(\omega)$ is the interference spectrum;

$G_n(\omega)$ is the noise spectrum;
$\Omega_0$ is complementary region in the frequency to $\Omega_+(B_1)$ and
$\Omega_+(B_1)$ represents the frequency region where the following inequality is satisfied:

$$\frac{\sqrt{G_n(\omega)}}{|Q(\omega)|} \leq \max_{\omega \in B_1} \frac{\sqrt{G_n(\omega)}}{|Q(\omega)|}$$

23. The apparatus of claim 19 wherein
the interference and the noise are part of a space based radar scene.

24. The apparatus of claim 19 wherein
the interference and the noise are part of an airborne based radar scene.

25. The apparatus of claim 19 wherein
the interference and the noise are part of a ground based radar scene.

26. The apparatus of claim 19 wherein
the interference and the noise are part of an underwater sonar scene.

27. The apparatus of claim 19 wherein
the transmit signal f(t), the target, the interference, and the noise are part of a cellular communication scene (ground based and/or space based) wherein the transmit signal f(t) represents the desired voice or data modulated signal, the target represents the channel, and the interference represents all interference signals.

28. An apparatus comprising
a transmitter;
and a receivers,
wherein the transmitter is configured to output a first transmit signal f(t) towards a target,
wherein the target produces a first target signal when the first transmit signal interacts with the target,
wherein the first transmit signal f(t) has a first transmit signal bandwidth, first transmit signal energy, and a first transmit signal waveform,
wherein the receiver is configured to receive a first combination signal at the receiver, wherein the first combination signal includes a first noise signal, a first interference signal, and a first return signal which is the first transmit signal returned back from the target disregarding any effects of noise or interference,
wherein the receiver is configured to act on the first combination signal to form a first receiver output signal,
wherein the first receiver output signal has a first receiver output signal waveforms,
wherein the first transmit signal has a first performance level which is a ratio of the first receiver output signal to the first interference signal plus the first noise signal,
wherein the transmitter is configured to output a second transmit signal f(t) towards the target,
wherein the second transmit signal has a second transmit signal bandwidth, a second transmit signal energy, and a second transmit signal waveform,
wherein the receiver is configured to receive a second combination signal at the receiver, wherein the second combination signal includes a second noise signal, a second interference signal, and a second return signal which is the second transmit signal returned back from the target disregarding any effects of noise or interference, wherein the receiver is configured to act on the second combination signal to form a second receiver output signal, wherein the second receiver output signal has a second receiver output signal waveform, wherein the second transmit signal bandwidth and the first transmit signal bandwidth are different, wherein the second transmit signal energy and the first transmit signal energy are different, wherein if the second transmit signal bandwidth is higher than the first transmit signal bandwidth, then the second transmit signal energy will be lower than the first transmit signal energy, wherein if the second transmit signal bandwidth is lower than the first transmit signal bandwidth, then the second transmit signal energy will be higher than the first transmit signal energy, wherein the second transmit signal has a second performance level which is a ratio of the second receiver output signal to the second interference signal plus the second noise signal, and wherein the first performance level is substantially the same as second performance level.

29. The apparatus of claim 28 further comprising wherein the transmitter is configured so that the first transmit signal bandwidth $B_1$ is selected and the first transmit signal energy $E_1$ is selected according to $$E_1 = \frac{1}{2\pi} \int_{\Omega_+(B_1)} \sqrt{G_n(\omega)} \left( \lambda_1 - \frac{\sqrt{G_n(\omega)}}{Q(\omega)} \right) \frac{|Q(\omega)|}{G_c(\omega)} d\omega$$

wherein $$\lambda_1 = \max_{\omega \in B_1} \frac{\sqrt{G_n(\omega)}}{|Q(\omega)|},$$

and wherein the transmitter is configured to determine the first performance level for an energy bandwidth pair $(E_1, B_1)$, wherein the first performance level is given by $$SINR_1(B_1) = \frac{1}{2\pi} \int_{\Omega_+(B_1)} \left( |Q(\omega)| - \frac{\sqrt{G_n(\omega)}}{\lambda_1} \right) \frac{|Q(\omega)|}{G_c(\omega)} d\omega$$

wherein $Q(\omega)$ is a Fourier transform of the first target signal;

$G_c(\omega)$ is a spectrum of the first interference signal;

$G_n(\omega)$ is a spectrum of the first noise signal; and $\Omega_+(B_1)$ represents the frequency region where the following inequality is satisfied:

$$\frac{\sqrt{G_n(\omega)}}{|Q(\omega)|} \leq \max_{\omega \in B_1} \frac{\sqrt{G_n(\omega)}}{|Q(\omega)|}.$$

30. The apparatus of claim 29 further comprising configuring the transmitter so that the second transmit signal bandwidth $B_2$ is selected, which is larger than the first transmit signal bandwidth $B_1$ so as to satisfy the condition $$SINR_1(B_2) \leq \frac{1}{2\pi} \int_{\Omega_+(B_1)} \frac{|Q(\omega)|^2}{G_c(\omega)} d\omega,$$

and for which the second transmit signal energy $E_2$ and the second performance level $SINR_1(B_2)$ are determined as follows $$E_2 = \frac{1}{2\pi} \int_{\Omega_+(B_2)} \sqrt{G_n(\omega)} \left( \lambda_2 - \frac{\sqrt{G_n(\omega)}}{Q(\omega)} \right) \frac{|Q(\omega)|}{G_c(\omega)} d\omega$$

and $$SINR_1(B_2) = \frac{1}{2\pi} \int_{\Omega_+(B_2)} \left( |Q(\omega)| - \frac{\sqrt{G_n(\omega)}}{\lambda_2} \right) \frac{|Q(\omega)|}{G_c(\omega)} d\omega.$$

where $\lambda_2 = \max_{\omega \in B_2} \frac{\sqrt{G_n(\omega)}}{|Q(\omega)|}$, and $\Omega_+(B_2)$ represents the frequency region where the following inequality is satisfied:

$$\frac{\sqrt{G_n(\omega)}}{|Q(\omega)|} \leq \max_{\omega \in B_2} \frac{\sqrt{G_n(\omega)}}{|Q(\omega)|};$$

and wherein the transmitter is configured so that a third transmit signal is output by the transmitter, wherein the third transmit signal has an energy level $E_3$ that satisfies the identity $$SINR_1(E_3, B_1) = a_1 - \frac{c_1^2}{E_3 + b_1} = SINR_1(B_2),$$

where $$a_1 = \frac{1}{2\pi} \int_{\Omega_+(B_1)} \frac{|Q(\omega)|^2}{G_c(\omega)} d\omega,$$

$$b_1 = \frac{1}{2\pi} \int_{\Omega_+(B_1)} \frac{G_n(\omega)}{G_c(\omega)} d\omega,$$

and $$c_1 = \frac{1}{2\pi} \int_{\Omega_+(B_1)} \frac{\sqrt{G_n(\omega)} |Q(\omega)|}{G_c(\omega)} d\omega$$

31. The apparatus of claim 30 further wherein the first transmit signal bandwidth is $B_1$, wherein the first transmit signal energy is $E_1$, wherein the third transmit signal has a bandwidth which is $B_2$, wherein the third transmit signal has a prescribed energy level which is $E_3$, wherein the first transmit signal has a fourier transform given by $$|F(\omega)|^2 = \begin{cases} \sqrt{G_n(\omega)} \left( \left( \max_{\omega \in B_2} \frac{\sqrt{G_n(\omega)}}{|Q(\omega)|} \right) - \frac{\sqrt{G_n(\omega)}}{|Q(\omega)|} \right) \frac{|Q(\omega)|}{G_c(\omega)}, & \omega \in \Omega_+(B_2) \\ 0, & \text{otherwise} \end{cases};$$

wherein the third transmit signal has a fourier transform given by $$|F(\omega)|^2 = \begin{cases} \dfrac{\sqrt{G_n(\omega)}\left(\lambda(E_3)|Q(\omega)| - \sqrt{G_n(\omega)}\right)}{G_c(\omega)}, & \omega \in \Omega_+(B_1) \\ 0, & \omega \in \Omega_o \end{cases}$$

wherein $$\lambda(E_3) = \dfrac{E_3 + \dfrac{1}{2\pi}\int_{\Omega_+(B_1)}\dfrac{G_n(\omega)}{G_c(\omega)}d\omega}{\dfrac{1}{2\pi}\int_{\Omega_+(B_1)}\dfrac{\sqrt{G_n(\omega)}|Q(\omega)|}{G_c(\omega)}d\omega}$$

and wherein the first and third transmit signals have the same performance level $SINR_1(B_2)$, in terms of target detection in interference and noise, when used in conjunction with the receiver, wherein the receiver has a receiver filter which has a Fourier Transform, $H_{opt}(\omega)$, given by $$H_{opt}(\omega) = \dfrac{Q^*(\omega)F^*(\omega)}{G_c(\omega)|F(\omega)|^2 + G_n(\omega)} e^{-j\omega t_o}$$

wherein $t_o$ is a decision instant at which the first target signal is to be detected.

32. The apparatus of claim 28 wherein
the first transmit signal f(t), the target, the first interference signal, and the first noise signal are part of a cellular communication scene where the first transmit signal f(t) represents the desired voice or data modulated signal, the target represents the channel, and the first interference represents all interference signals in the first combination signal.

33. The apparatus of claim 28 wherein
the first interference signal and the first noise signal are part of a space based radar scene.

34. The apparatus of claim 28 wherein
the first interference signal and the first noise signal are part of an airborne based radar scene.

35. The apparatus of claim 28 wherein
the first interference signal and the first noise signal are part of a ground based radar scene.

36. The apparatus of claim 28 wherein
the first interference signal and the first noise signal are part of an underwater sonar scene.

* * * * *